United States Patent
Nakahira et al.

(10) Patent No.: US 11,950,115 B2
(45) Date of Patent: Apr. 2, 2024

(54) WIRELESS COMMUNICATION PERFORMANCE MEASUREMENT METHOD AND WIRELESS COMMUNICATION PERFORMANCE MEASUREMENT SYSTEM

(71) Applicant: NIPPON TELEGRAPH AND TELEPHONE CORPORATION, Tokyo (JP)

(72) Inventors: Toshiro Nakahira, Musashino (JP); Tomoki Murakami, Musashino (JP); Hirantha Abeysekera, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 356 days.

(21) Appl. No.: 17/603,769

(22) PCT Filed: Apr. 17, 2020

(86) PCT No.: PCT/JP2020/016896
§ 371 (c)(1),
(2) Date: Oct. 14, 2021

(87) PCT Pub. No.: WO2020/218199
PCT Pub. Date: Oct. 29, 2020

(65) Prior Publication Data
US 2022/0240114 A1 Jul. 28, 2022

(30) Foreign Application Priority Data

Apr. 22, 2019 (JP) .................................. 2019-081323

(51) Int. Cl.
*H04W 24/08* (2009.01)
*H04W 16/18* (2009.01)
(Continued)

(52) U.S. Cl.
CPC ........... *H04W 24/08* (2013.01); *H04W 16/18* (2013.01); *H04W 24/06* (2013.01); *H04W 24/10* (2013.01)

(58) Field of Classification Search
CPC ..... H04W 24/08; H04W 24/06; H04W 24/10; H04W 16/18
See application file for complete search history.

(56) References Cited

U.S. PATENT DOCUMENTS 9,215,686 B2 * 12/2015 Kazmi .................. H04B 17/27
9,693,276 B1 * 6/2017 Wuellner ............ H04W 36/245
(Continued)

OTHER PUBLICATIONS

The 802.11 Working Group of the LAN/MAN Standards Committee of the IEEE Computer Society, Part 11: Wireless LAN Medium Access Control (MAC) and Physical Layer (PHY) Specifications, IEEE Std 802.11-016, IEEE Standard for Information technology— Telecommunications and information exchange between systems Local and metropolitan area networks—Specific requirements, Dec. 2016.

Primary Examiner — Redentor Pasia
(74) Attorney, Agent, or Firm — Harness, Dickey & Pierce, P.L.C.

(57) ABSTRACT

A measurement station collects radio base station performance information related to a radio communication performance of each radio base station, radio connection information related to a radio communication performance and a communication status of a corresponding radio terminal station, generates a measurement condition and an expected measurement result based on the radio base station performance information and the radio connection information, (Continued)

and notifies a measurement control signal corresponding to the measurement condition to the radio terminal station through the radio base station; the radio terminal station performs a communication setting of an own station based on the notified measurement control signal, and notifies a measurement preparation status to the measurement station; and the measurement station measures the radio communication performance by causing a flow of a measurement traffic to the radio terminal station through the radio base station, acquiring a measurement result, and determining whether the measurement result is within a range of the expected measurement result.

6 Claims, 6 Drawing Sheets

(51) Int. Cl.
  *H04W 24/06* (2009.01)
  *H04W 24/10* (2009.01)

(56) References Cited

U.S. PATENT DOCUMENTS

| | | | |
|---|---|---|---|
| 2016/0073287 A1* | 3/2016 | Himayat | H04W 28/0236 370/236 |
| 2017/0339660 A1* | 11/2017 | Kazmi | H04W 64/003 |
| 2018/0206134 A1* | 7/2018 | Kudo | H04W 74/0816 |
| 2020/0084087 A1* | 3/2020 | Sharma | H04W 24/08 |
| 2021/0119881 A1* | 4/2021 | Shirazipour | H04L 41/0823 |
| 2022/0110155 A1* | 4/2022 | Chou | H04W 74/085 |

* cited by examiner

| MEASUREMENT NUMBER | MEASUREMENT BASE STATION NUMBER | DESTINATION TERMINAL STATION NUMBER | MEASUREMENT TRAFFIC | ... |
|---|---|---|---|---|
| 1 | 10-1 | 30-1-1 | TRANSMISSION DIRECTION: DOWNLINK<br>PROTOCOL: UDP<br>RATE: 200 Mbps<br>DESTINATION: 30-1-1<br>TIME: 30 sec | ... |
| 2 | 10-1 | 30-1-1 | TRANSMISSION DIRECTION: DOWNLINK<br>PROTOCOL: UDP<br>RATE: 200 Mbps<br>DESTINATION: SUBORDINATE TERMINAL STATION<br>TIME: 30 sec | ... |
| | 10-2 | NO TERMINAL | TRANSMISSION DIRECTION: DOWNLINK<br>PROTOCOL: UDP<br>RATE: 200 Mbps<br>DESTINATION: BROADCAST<br>TIME: 30 sec | ... |
| | 10-3 | NO TERMINAL | TRANSMISSION DIRECTION: DOWNLINK<br>PROTOCOL: UDP<br>RATE: 200 Mbps<br>DESTINATION: BROADCAST<br>TIME: 30 sec | ... |
| ... | ... | ... | ... | ... |

Fig. 3

| MEASUREMENT NUMBER | MEASUREMENT BASE STATION NUMBER | DESTINATION TERMINAL STATION NUMBER | EXPECTED MEASURED VALUE |
|---|---|---|---|
| 1 | 10-1 | 30-1-1 | 100 Mbps OR GREATER |
| 2 | 10-1 | 30-1-1 | 30 Mbps OR GREATER |
| | 10-2 | NO TERMINAL | - |
| | 10-3 | NO TERMINAL | - |
| ... | ... | ... | ... |

Fig. 4

| MEASUREMENT NUMBER | MEASUREMENT BASE STATION NUMBER | DESTINATION TERMINAL STATION NUMBER | MEASURED VALUE |
|---|---|---|---|
| 1 | 10-1 | 30-1-1 | 110 Mbps OR GREATER |
| 2 | 10-1 | 30-1-1 | 35 Mbps |
| | 10-2 | NO TERMINAL | 30 Mbps |
| | 10-3 | NO TERMINAL | 40 Mbps |
| ... | ... | ... | ... |

Fig. 5

WIRELESS COMMUNICATION PERFORMANCE MEASUREMENT METHOD AND WIRELESS COMMUNICATION PERFORMANCE MEASUREMENT SYSTEM

CROSS-REFERENCE TO RELATED APPLICATIONS

This application is a 371 U.S. National Phase of International Application No. PCT/JP2020/016896 filed on Apr. 17, 2020, which claims priority to Japanese Application No. 2019-081323 filed on Apr. 22, 2019. The entire disclosures of the above applications are incorporated herein by reference.

TECHNICAL FIELD

The present invention relates to a radio communication performance measurement method and a radio communication performance measurement system for measuring the radio communication performance of a plurality of radio base stations in a radio communication system in which the plurality of radio base stations and subordinate radio terminal stations thereof are connected together.

BACKGROUND ART

As a high-speed radio communication system using radio waves of a license-free band, there is the IEEE 802.11 wireless LAN standard, which specifies various standards such as 11a, 11b, 11g, 11n and 11ac with different radio frequency bands, radio transmission techniques, and radio transmission rates. The 11b standard is a radio transmission rate of up to 11 Mbps using the 2.4 GHz band, the 11a standard is a radio transmission rate of up to 54 Mbps using the 5 GHz band, and the 11g standard is a radio transmission rate of up to 54 Mbps using the 2.4 GHz band. The 11n standard is a radio transmission rate of up to 600 Mbps using the 2.4 GHz band and 5 GHz band, and the 11ac standard is a radio transmission rate of up to 6900 Mbps using the 5 GHz band. These various IEEE 802.11 wireless LAN standards are backward compatible and can be used even in a mixed environment.

In public areas such as stations, airports, and shopping malls, radio connection services are provided to attract customers and improve user satisfaction. In such an environment, multiple radio base stations are installed in an area to accommodate a large number of users, and after installation, the performance is sometimes measured to determine whether the expected radio communication performance of the radio connection service can be provided (NPTL 1).

CITATION LIST

Non Patent Literature

NPTL 1: IEEE Std 802.11-2016, December 2016.

SUMMARY OF THE INVENTION

Technical Problem

To measure the radio communication performance of a radio connection service in an area where a plurality of radio base stations are installed, it is conceivable to sequentially test the radio base stations one by one. However, radio base stations installed at a close distance from each other may interfere with each other depending on the used radio channel, and it is not possible to measure the performance of the entire area by measuring one unit at a time.

Here, radio terminal stations for testing are connected to respective radio base stations and radio communication is simultaneously performed with the same timing, thereby measurement can be performed with mutual radio waves interfering. This however requires a large number of personnel and operation for the testing work. In addition, the radio communication environment differs depending on the location of the radio terminal station. Thus, to measure the radio communication performance of one radio base station, the radio terminal station needs to be disposed at multiple locations, such as a location directly under the radio base station, a remote location, and an intermediate point thereof, which takes a lot of work operations and preparation tasks required for the radio communication performance measurement.

Further, the number of antennas of the radio base station, the type of supported standard, and the optional functions in the standard are different from each other. It is necessary for the measurer to change the settings in consideration of the measurement conditions in accordance with the base station in the field. In addition, proficient measurers can make measurements while checking the validity of the measurement results, but unfamiliar measurers may perform checking after completion of the measurements and thus may need to make measurements again.

An object of the present invention is to provide a radio communication performance measurement method and a radio communication performance measurement system that can measure the radio communication performance of a radio base station from a remote location in a radio communication system in which a plurality of radio base stations and subordinate radio terminal stations thereof are connected together.

Means for Solving the Problem

A radio communication performance measurement method of a first invention is a method including a plurality of radio base stations, a subordinate radio terminal station of each of the plurality of radio base stations, and a measurement station configured to control each of the plurality of radio base stations, the method being a method of measuring a radio communication performance of each of the plurality of radio base stations, the method comprising, by the measurement station, collecting radio base station performance information related to the radio communication performance of the radio base station and radio connection information related to a radio communication performance and a communication status of the radio terminal station, generating a measurement condition and an expected measurement result based on the radio base station performance information and the radio connection information, and notifying a measurement control signal corresponding to the measurement condition to the radio terminal station through the radio base station, by the radio terminal station, performing a communication setting of an own station based on the notified measurement control signal, and notifying a measurement preparation status to the measurement station, and, by the measurement station, measuring the radio communication performance by causing a flow of a measurement traffic to the radio terminal station through the radio base station, acquiring a measurement result, and determining whether the measurement result is within a range of the expected measurement result.

In the radio communication performance measurement method of the first invention, the measurement station gives an instruction of remeasurement, radio reconnection or power reboot to the radio terminal station when the measurement result is not within the range of the expected measurement result.

In the radio communication performance measurement method of the first invention, as the measurement condition, the measurement station simultaneously gives instructions to sets of the plurality of radio base stations and the radio terminal stations to measure interference among the plurality of radio base stations.

In the radio communication performance measurement method of the first invention, as the measurement condition, the measurement station sequentially gives instructions to the plurality of radio terminal stations to measure the radio communication performance at different positions.

A radio communication performance measurement system of a second invention includes a plurality of radio base stations, a subordinate radio terminal station of each of the plurality of radio base stations, and a measurement station configured to control each of the plurality of radio base stations, the system being configured to measure a radio communication performance of each of the plurality of radio base stations, wherein the measurement station includes a unit configured to collect radio base station performance information related to the radio communication performance of the radio base station and radio connection information related to a radio communication performance and a communication status of the radio terminal station, generate a measurement condition and an expected measurement result based on the radio base station performance information and the radio connection information, and notify a measurement control signal corresponding to the measurement condition to the radio terminal station through the radio base station, wherein the radio terminal station includes a unit configured to perform a communication setting of an own station based on the notified measurement control signal, and notify a measurement preparation status to the measurement station, and the measurement station includes a unit configured to measure the radio communication performance by causing a flow of a measurement traffic to the radio terminal station through the radio base station, acquire a measurement result, and determine whether the measurement result is within a range of the expected measurement result.

In the radio communication performance measurement system of the second invention, the measurement station includes a unit configured to give an instruction of remeasurement, radio reconnection or power reboot to the radio terminal station when the measurement result is not within the range of the expected measurement result.

Effects of the Invention

According to the present invention, a measurement station can control a radio connection destination of a radio terminal station disposed in an area and perform measurement by causing a flow of a traffic in a plurality of patterns. In addition, the measurement result and an expected measurement result are compared with each other and then reconnection or power reboot of the radio terminal station is performed for remeasurement. This can considerably reduce work operations and preparation tasks for the radio system performance measurement.

BRIEF DESCRIPTION OF DRAWINGS

FIG. 3 illustrates an exemplary measurement condition.

FIG. 4 illustrates an exemplary expected measurement result.

FIG. 5 illustrates an exemplary measurement result.

DESCRIPTION OF EMBODIMENTS

Figure 1:
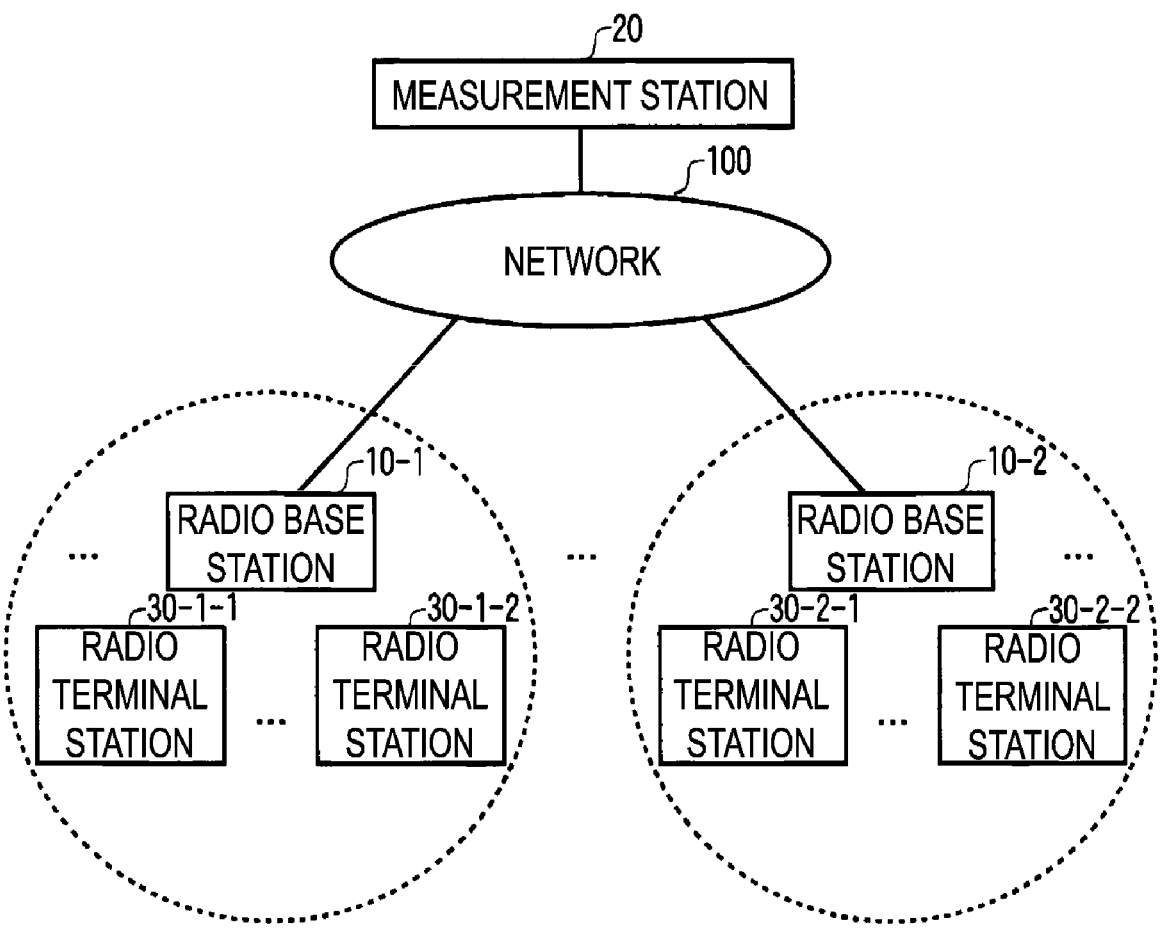
FIG. 1 illustrates an exemplary configuration of a radio communication performance measurement system of the present invention.

FIG. 1 illustrates an exemplary configuration of a radio communication performance measurement system of the present invention.

In FIG. 1, a plurality of radio base stations 10-1 and 10-2 and a measurement station 20 are connected together through a network 100. The radio base station 10-1 is connected to subordinate radio terminal stations 30-1-1 and 30-1-2, and the radio base station 10-2 is connected to subordinate radio terminal stations 30-2-1 and 30-2-2.

Figure 2:
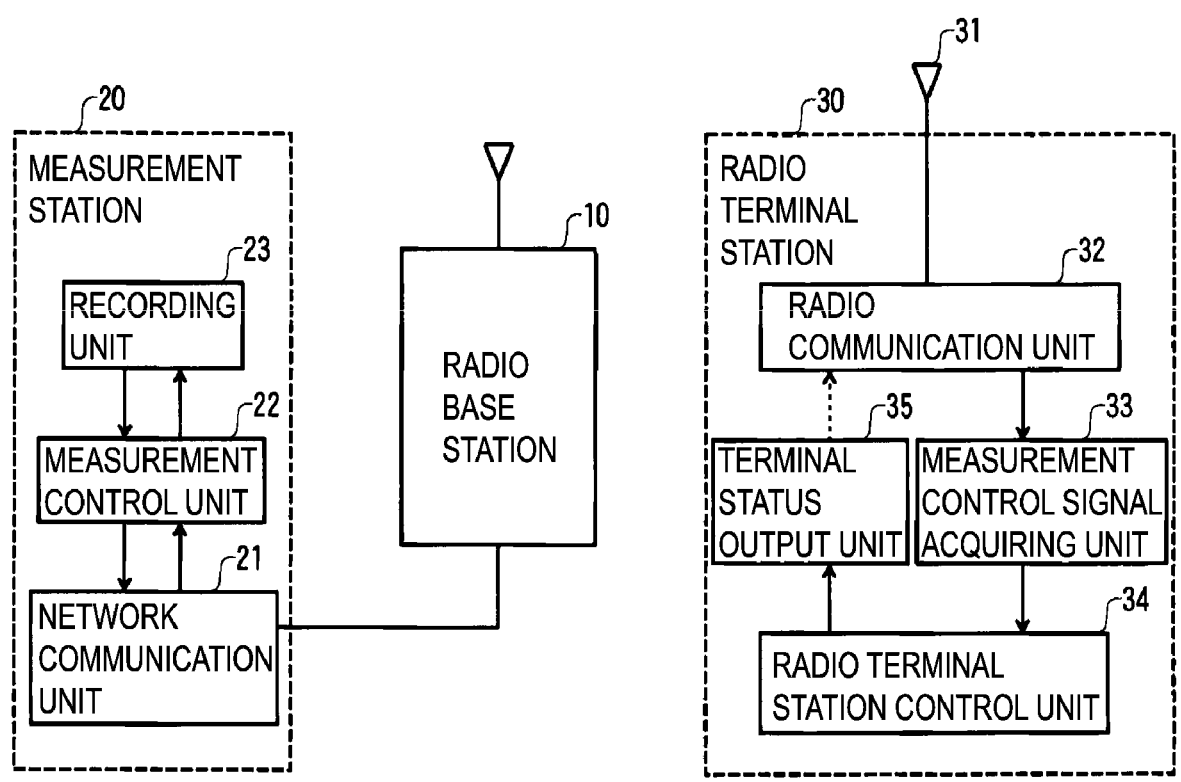
FIG. 2 illustrates exemplary configurations of a measurement station 20 and a radio terminal station 30.

FIG. 2 illustrates exemplary configurations of the measurement station 20 and a radio terminal station 30. It is to be noted that, here, the radio terminal stations are collectively referred to as the radio terminal station 30.

In FIG. 2, the measurement station 20 includes a network communication unit 21, a measurement control unit 22, and a recording unit 23.

The network communication unit 21 acquires radio base station performance information from a radio base station 10 through the network 100, acquires radio connection information and/or a measurement preparation status from the radio terminal station 30, and transmits a measurement control signal and/or a measurement traffic to the radio terminal station 30.

The measurement control unit 22 outputs, to the recording unit 23, the radio base station performance information acquired from the radio base station 10, and outputs, to the recording unit 23, the radio connection information acquired from the radio terminal station 30. Then, the measurement control unit 22 calculates a measurement condition and an expected measurement result on the basis of the radio base station performance information and the radio connection information, generates a measurement control signal corresponding to the measurement condition, and notifies the generated signal to the corresponding radio terminal station 30. In addition, the measurement control unit 22 acquires a measurement preparation status from the radio terminal station 30, and causes a flow of a measurement traffic to measure the traffic amount. Then, whether the result of the measurement is within a range of the expected measurement result is determined for each destination radio terminal station 30. When the result is not within the range, remeasurement, turning off and on of the radio function, and/or turning off and on of the power source of the corresponding radio terminal station 30 are instructed. Then, the measurement preparation status is again acquired to perform remeasurement.

The recording unit 23 records the radio base station performance information, the radio connection information of the radio terminal station 30, the measurement condition, the expected measurement result, and the measurement result input from the measurement control unit 22, and outputs corresponding information to the measurement control unit 22 in response to a reading request.

Here, the radio base station performance information is information related to the communication performance of a radio communication performed by the radio base station 10, and examples of the radio base station performance information include the compatible standard, the number of antennas, the maximum band width, the maximum transmission rate, and the compatibility with transmission beam forming.

The radio connection information is information related to the radio communication performance and the communication status of the radio terminal station 30. The radio communication performance includes the compatible standard, the number of antennas, the maximum band width, the compatibility with transmission beam forming and the like, and the communication status includes the received power, the received SNR and the like.

The measurement control signal is a signal for the measurement station 20 to notify the measurement condition to the radio terminal station 30.

The measurement preparation status represents a status where the radio terminal station 30 has performed a communication setting of its own station based on a measurement condition from the measurement station 20, and includes an activation status of an application for measurement, an operation status of the terminal station and the like.

The measurement traffic is a communication traffic flowing between the measurement station 20 and the radio terminal station 30 using an application for measurement, and may be set in consideration of a user usage method such as the destination, the packet size, the communication protocol, and the packet originate calling timing.

As illustrated in FIG. 3, the measurement condition includes the measurement number, the measurement base station number, the destination terminal station number, the measurement traffic (such as the transmission direction, the protocol, the rate, the destination, and the time) and the like.

As illustrated in FIG. 4, the expected measurement result includes the measurement number, the measurement base station number, the destination terminal station number, and the expected measurement value. It is to be noted that the expected measurement result may be simply calculated based on the radio connection information acquired from a radio terminal station. In addition, in the case where a single throughput test result has been acquired through measurement without adding an interference traffic thereto and further radio environment information such as interference signal information and/or a channel busy rate can be acquired at a radio base station, the value thereof may be used to calculate the expected measurement result.

As illustrated in FIG. 5, the measurement result includes the measurement number, the measurement base station number, the destination terminal station number, and the measurement value.

The measurement station 20 has been described above. It is to be noted that blocks mounted in typical measurement stations are omitted.

In FIG. 2, the radio terminal station 30 includes an antenna 31, a radio communication unit 32, a measurement control signal acquiring unit 33, a radio terminal station control unit 34, and a terminal status output unit 35.

The radio communication unit 32 demodulates radio signal data received at the antenna 31 and outputs the demodulated data to the measurement control signal acquiring unit 33, and, notifies, to the measurement station 20 through the antenna 31, a terminal station status input from the terminal status output unit 35.

The measurement control signal acquiring unit 33 acquires a measurement control signal from the radio signal data acquired from the radio communication unit 32, and outputs the acquired signal to the radio terminal station control unit 34.

On the basis of the measurement control signal notified from the measurement station 20, the radio terminal station control unit 34 implements, as a measurement control of its own station, radio connection to a designated connection destination, switching between disabling and enabling of the radio communication unit 32, power reboot of its own station, and the like, and outputs the result of the implementation as a measurement preparation status to the terminal status output unit 35 to notify the measurement preparation status to the measurement station 20.

The terminal status output unit 35 notifies, to the measurement station 20 from the radio communication unit 32, the measurement preparation status input from the radio terminal station control unit 34.

The radio terminal station 30 has been described above. It is to be noted that blocks mounted in typical radio terminal stations are omitted.

Figure 6:
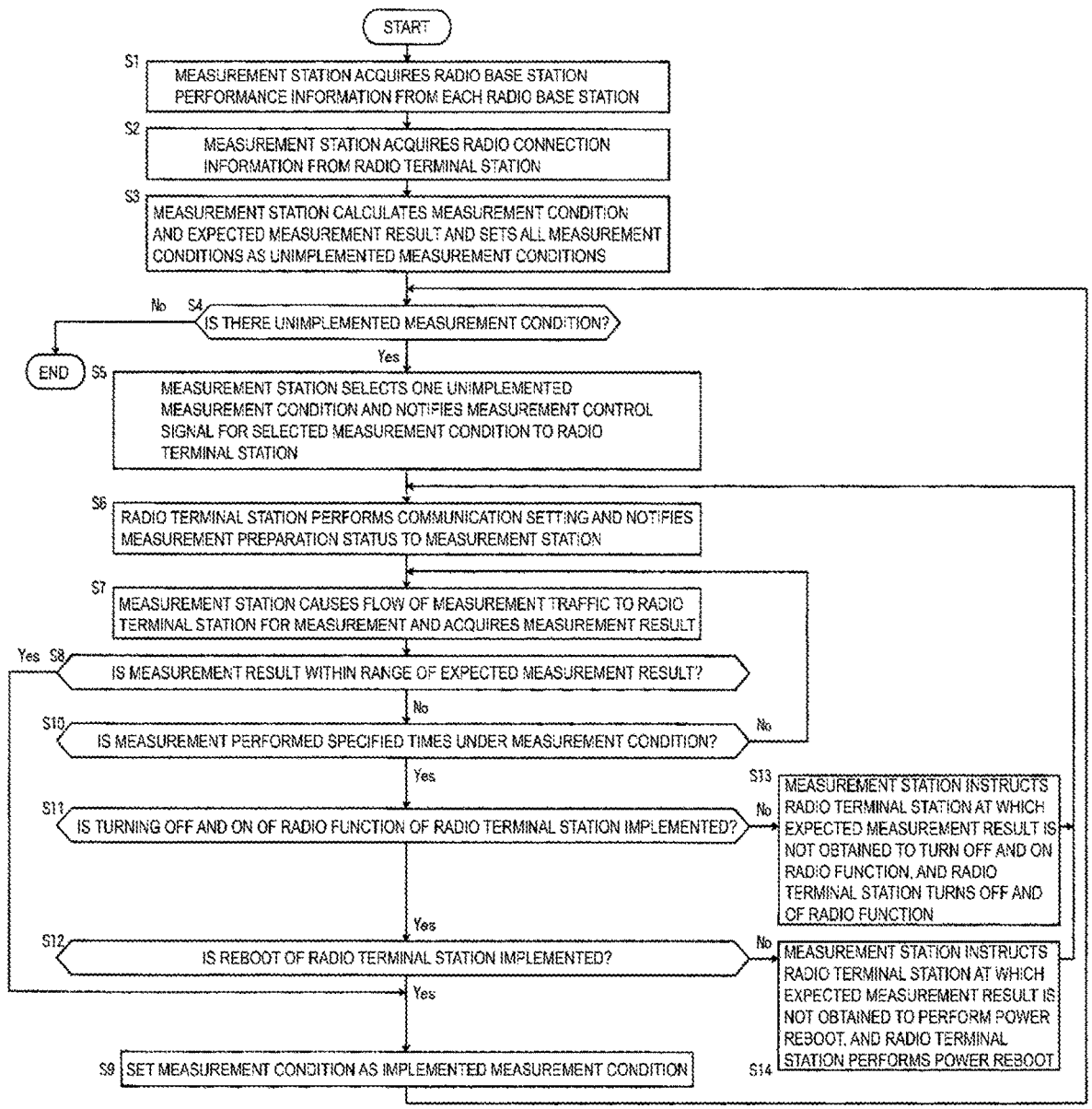
FIG. 6 is a flowchart of an exemplary processing procedure for a base station test for a radio base station 10.

FIG. 6 illustrates an exemplary processing procedure of a base station test for the radio base station 10. It is to be noted that in the base station test, exchanging of a traffic between the measurement station 20 and the radio terminal station 30 and the like are performed to measure the performance of the radio base station 10 therebetween.

In FIG. 6, the measurement station 20 acquires radio base station performance information from each radio base station (step S1), and acquires radio connection information from the radio terminal station (step S2).

Next, the measurement station 20 calculates a measurement condition and an expected measurement result on the basis of the collected radio base station performance information and radio connection information, and sets the all measurement conditions as unimplemented measurement conditions (step S3).

Examples of the measurement condition include a condition of covering all combinations and a condition of selecting some combinations in accordance with the compatible standard, the number of antennas, the maximum band width, and the compatibility with transmission beam forming. In addition, as a measurement condition, the measurement station 20 may simultaneously instruct sets of a plurality of radio base stations and radio terminal stations to measure the interference among the plurality of radio base stations. In addition, as a measurement condition, the measurement station 20 can sequentially instruct one radio base station and a plurality of radio terminal stations connected thereto to measure the radio communication performances at different positions from the radio base station.

Next, the measurement station 20 determines whether there is an unimplemented measurement condition (step S4). When there is an unimplemented measurement condition (Yes at step S4), the measurement station 20 selects one of unimplemented measurement conditions, and notifies a measurement control signal corresponding to the selected measurement condition to the radio terminal station 30 of the measurement target (step S5). It is to be noted that the measurement condition selected here may be selected in the order set by the measurer in advance, or may be freely selected. When there is no unimplemented measurement condition (No at step S4), the process is terminated.

Next, the radio terminal station 30 performs a communication setting of its own station based on the measurement control signal, and notifies the measurement preparation status to the measurement station 20 (step S6).

Next, the measurement station 20 causes a flow of a measurement traffic to the radio terminal station 30 of the measurement target through the radio base station 10 to perform a radio communication performance measurement, and acquires the measurement result (step S7). It is to be noted that in the case where the content of the traffic is downlink UDP or the like, it is difficult for the measurement station 20 to acquire the measurement result such as the amount of the wirelessly flowing traffic. Therefore, the measurement station 20 acquires feedback of the measurement result from the radio terminal station 30 after the measurement or periodically during the measurement.

Next, the measurement station 20 determines whether the measurement result acquired for each radio terminal station 30 is within a range of the expected measurement result corresponding to the condition of the implemented measurement (step S8). When the result is within the range (Yes at step S8), the measurement result is recorded, the measurement condition is set as an implemented measurement condition (step S9), and the process is returned to step S4. When the result is not within the range (No at step S8), whether the measurement has been implemented specified times under the selected measurement condition is determined (step S10). When the measurement has been implemented (Yes at step S10), the process proceeds to step S11, and when the measurement has not been implemented (No at step S10), the process is returned to step S7.

Next, for the radio terminal station 30 whose measurement result is not within the range of the expected measurement result even after the measurement has been implemented specified times under the selected measurement condition, whether radio reconnection by turning off and on the radio function has been implemented is determined (step S11). Then, when turning off and on of the radio function has been implemented (Yes at step S11), the process proceeds to step S12, and when turning off and on of the radio function has not been implemented (No at step S11), the measurement station 20 instructs the radio terminal station 30 at which the expected measurement result is not obtained to perform radio reconnection by turning off and on the radio function. Then, the radio terminal station 30 that has received the instruction implements radio reconnection by turning off and on the radio function (step S13), and the process is returned to step S6.

Next, for the radio terminal station 30 whose measurement result is not within the range of the expected measurement result even after radio reconnection has been implemented, whether power reboot has been implemented is determined (step S12). When power reboot has been implemented (Yes at step S12), the process proceeds to step S9. When power reboot has not been implemented (No at step S11), the measurement station 20 instructs the radio terminal station 30 at which the expected measurement result has not been obtained to perform power reboot and radio reconnection by turning off and on the power source. Then, the radio terminal station 30 that has received the instruction implements power reboot and radio reconnection by turning off and on the power source (step S14), and the process is returned to step S6.

An example of the measurement flow at the measurement station 20 has been described above. The measurement station 20 calculates the measurement condition on the basis of the collection information, and gives an instruction of measurement preparation to the radio terminal station 30 to perform measurement. Then, the obtained result is compared with the expected measurement result, and remeasurement, radio reconnection, and power reboot are implemented as required, and thus, the operations required for the measurement can be considerably reduced while increasing the radio measurement accuracy. It is to be noted that typically, remeasurement, radio reconnection, and power reboot are performed in the named order, but the order may be changed, and it is possible to perform only power reboot, for example.

The measurement station, the radio base station, and the radio terminal station of the above-described embodiment may be implemented by a general-purpose computer as well as by a dedicated apparatus. In such a case, it may be implemented by recording a program for implementing these functions in a computer-readable recording medium, causing a computer system to read the program recorded in the recording medium, and executing the program. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is a volatile memory inside a computer system that functions as a server or a client in the above-described case. The above-mentioned program may be used to implement some of the above-mentioned functions, and further, the above-mentioned functions may be implemented in combination with a program that is already recorded in a computer system. In addition, the above-mentioned program may be implemented using hardware such as a programmable logic device (PLD) or a field programmable gate array (FPGA).

REFERENCE SIGNS LIST

10 Radio base station
20 Measurement station
21 Network communication unit
22 Measurement control unit
23 Recording unit
30 Radio terminal station
31 Antenna
32 Radio communication unit
33 Measurement control signal acquiring unit
34 Radio terminal station control unit
35 Terminal status output unit
100 Network

The invention claimed is:

1. A radio communication performance measurement method including a plurality of radio base stations, a subordinate radio terminal station of each of the plurality of radio base stations, and a measurement station configured to control each of the plurality of radio base stations, the method being a method of measuring a radio communication performance of each of the plurality of radio base stations, the method comprising:

by the measurement station, collecting radio base station performance information related to the radio communication performance of the radio base station and radio connection information related to a radio communication performance and a communication status of the radio terminal station, generating a measurement condition and an expected measurement result based on the radio base station performance information and the radio connection information, and notifying a measurement control signal corresponding to the measurement condition to the radio terminal station through the radio base station;

by the radio terminal station, performing a communication setting of an own station based on the notified measurement control signal, and notifying a measurement preparation status to the measurement station; and by the measurement station, measuring the radio communication performance by causing a flow of a measurement traffic to the radio terminal station through the radio base station, acquiring a measurement result, and determining whether the measurement result is within a range of the expected measurement result.

2. The radio communication performance measurement method according to claim 1, wherein the measurement station gives an instruction of remeasurement, radio reconnection or power reboot to the radio terminal station when the measurement result is not within the range of the expected measurement result.

3. The radio communication performance measurement method according to claim 1, wherein, as the measurement condition, the measurement station simultaneously gives instructions to sets of the plurality of radio base stations and the radio terminal stations to measure interference among the plurality of radio base stations.

4. The radio communication performance measurement method according to claim 1, wherein, as the measurement condition, the measurement station sequentially gives instructions to the plurality of radio terminal stations to measure the radio communication performance at different positions.

5. A radio communication performance measurement system comprising:

a plurality of radio base stations;

a subordinate radio terminal station of each of the plurality of radio base stations; and a measurement station configured to control each of the plurality of radio base stations, the system being configured to measure a radio communication performance of each of the plurality of radio base stations, wherein the measurement station includes a unit configured to collect radio base station performance information related to the radio communication performance of the radio base station and radio connection information related to a radio communication performance and a communication status of the radio terminal station, generate a measurement condition and an expected measurement result based on the radio base station performance information and the radio connection information, and notify a measurement control signal corresponding to the measurement condition to the radio terminal station through the radio base station, the radio terminal station includes a unit configured to perform a communication setting of an own station based on the notified measurement control signal, and notify a measurement preparation status to the measurement station, and the measurement station includes a unit configured to measure the radio communication performance by causing a flow of a measurement traffic to the radio terminal station through the radio base station, acquire a measurement result, and determine whether the measurement result is within a range of the expected measurement result.

6. The radio communication performance measurement system according to claim 5, wherein the measurement station includes a unit configured to give an instruction of remeasurement, radio reconnection or power reboot to the radio terminal station when the measurement result is not within the range of the expected measurement result.

* * * * *